June 4, 1940.                L. C. DEANE                2,203,255
                APPARATUS FOR MAKING BOBBIN CORE TUBES
                    Filed May 13, 1939          6 Sheets-Sheet 1
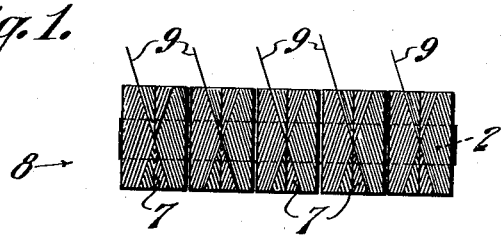
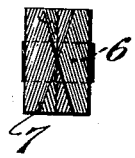
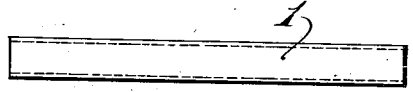
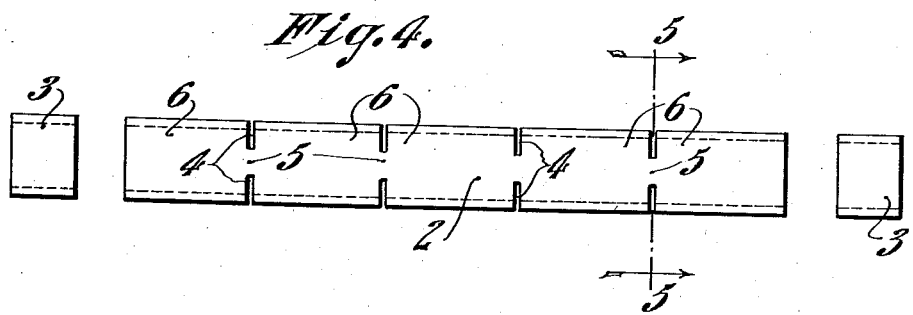
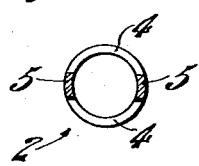 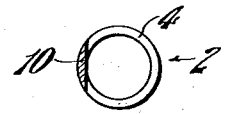
INVENTOR,
Leon C. Deane,
BY
ATTORNEY.

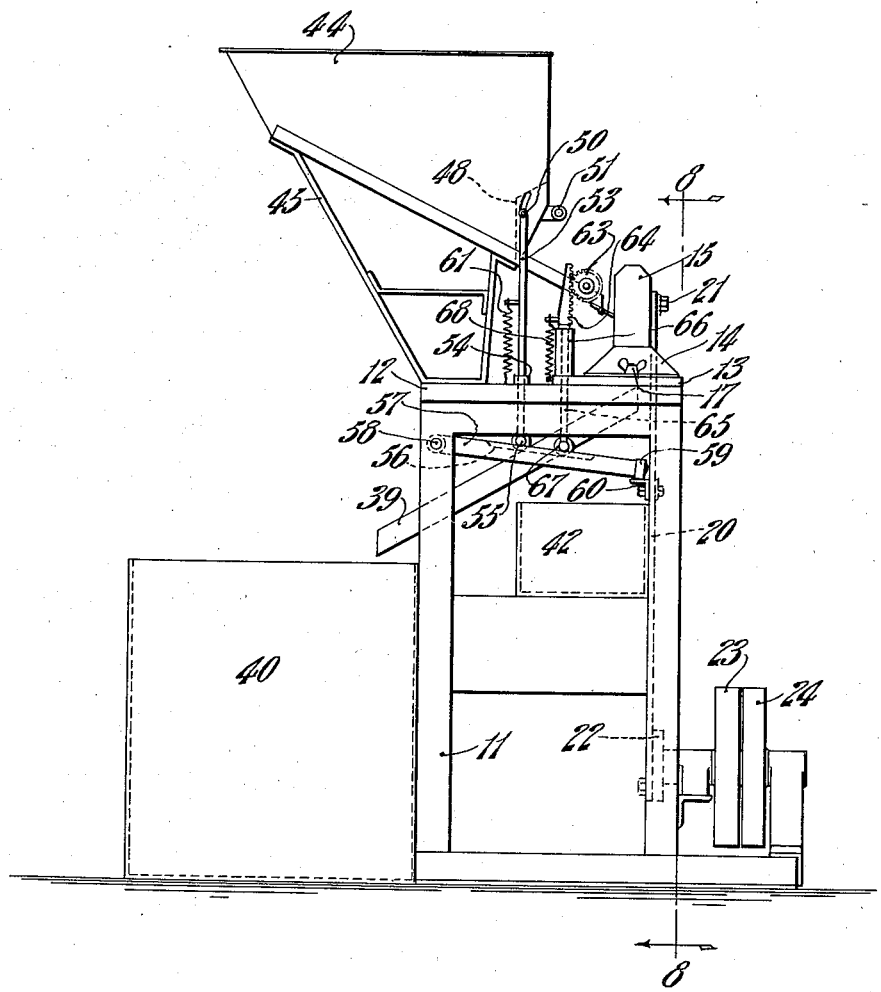

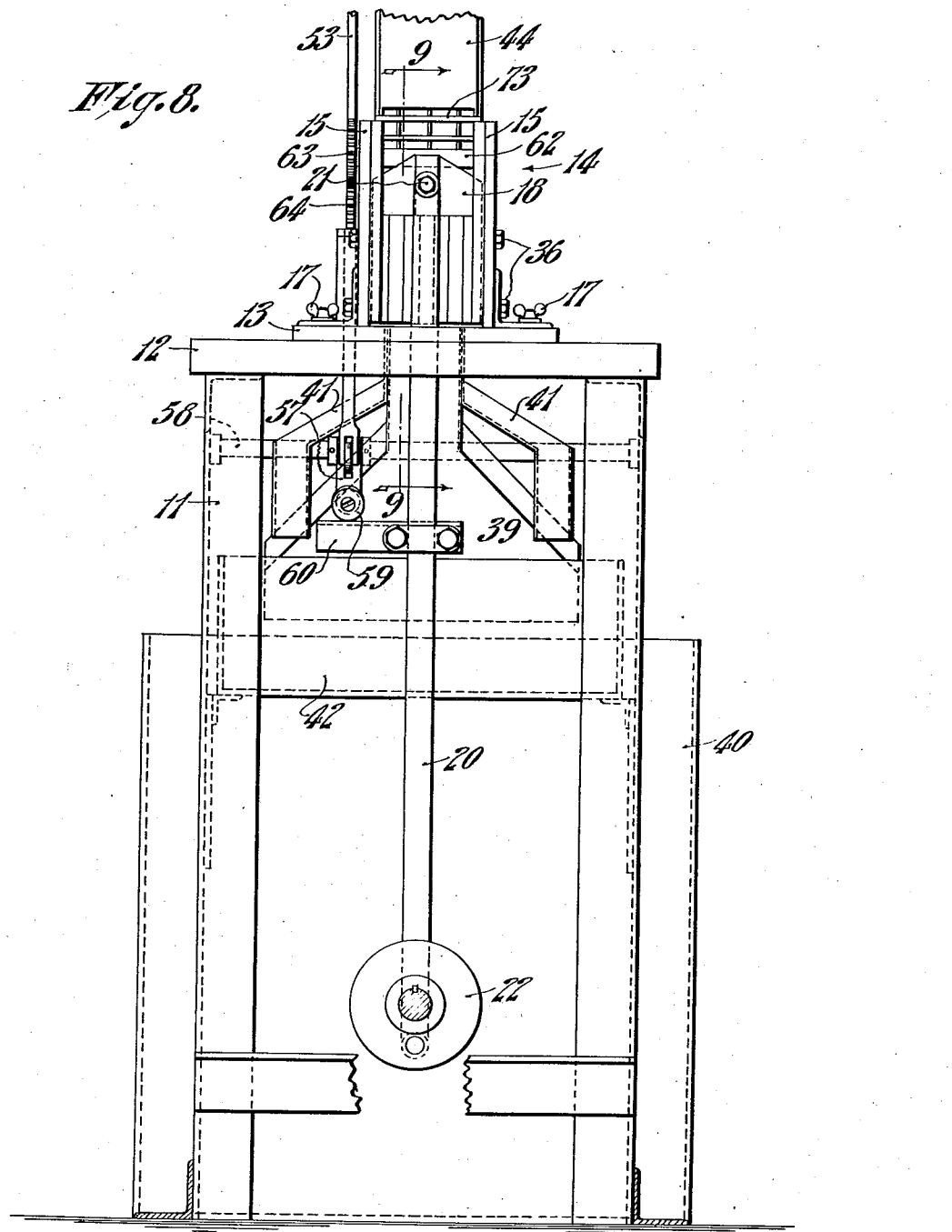

June 4, 1940. L. C. DEANE 2,203,255
APPARATUS FOR MAKING BOBBIN CORE TUBES
Filed May 13, 1939 6 Sheets-Sheet 4
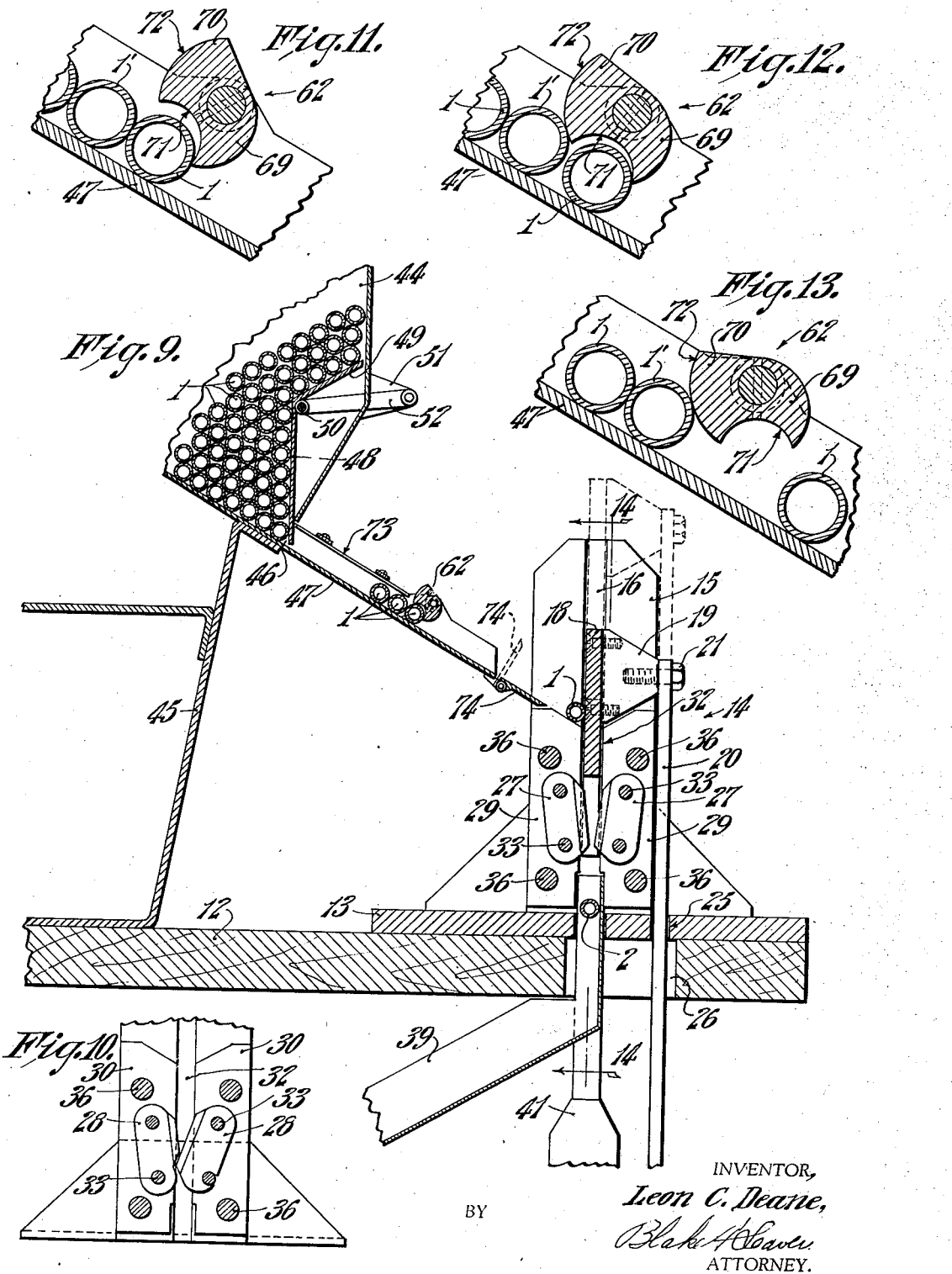
INVENTOR,
Leon C. Deane,
BY
ATTORNEY.

June 4, 1940.
L. C. DEANE
2,203,255
APPARATUS FOR MAKING BOBBIN CORE TUBES
Filed May 13, 1939
6 Sheets-Sheet 5
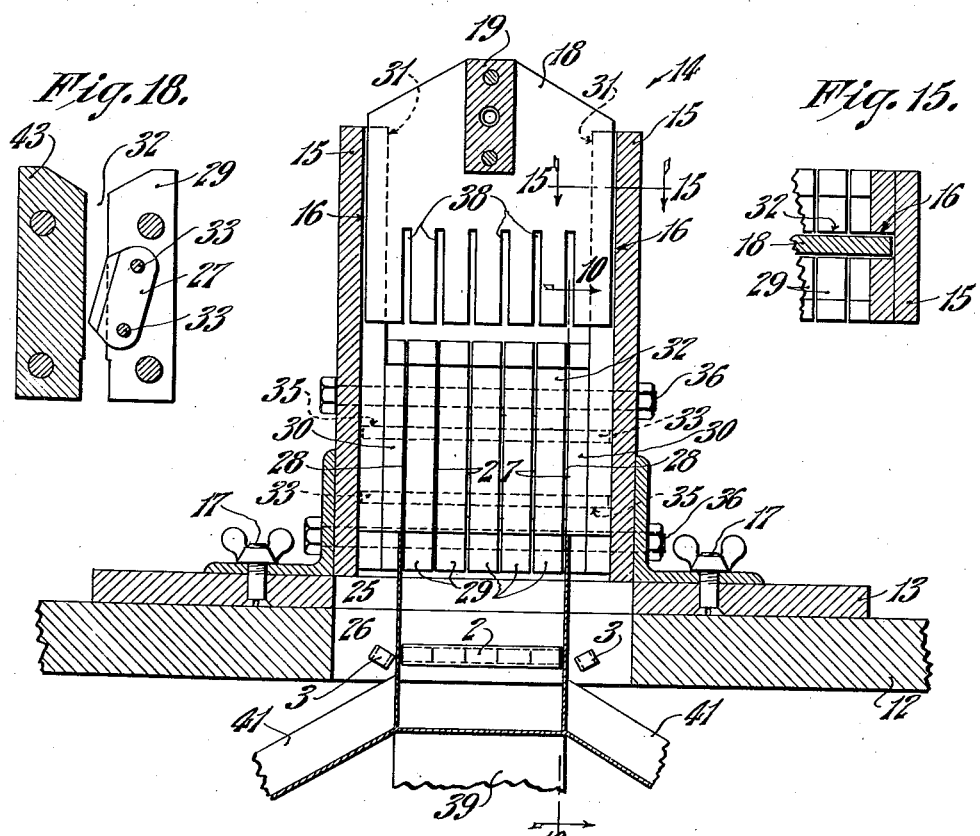
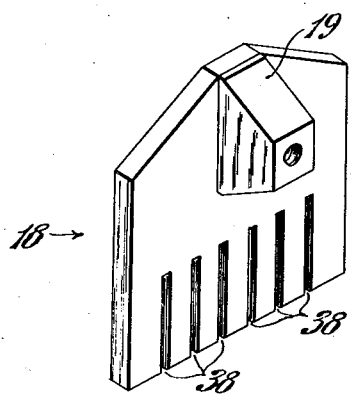
INVENTOR,
Leon C. Deane,
ATTORNEY.

June 4, 1940.  L. C. DEANE  2,203,255
APPARATUS FOR MAKING BOBBIN CORE TUBES
Filed May 13, 1939  6 Sheets-Sheet 6

INVENTOR,
Leon C. Deane,
BY
ATTORNEY.

Patented June 4, 1940

2,203,255

UNITED STATES PATENT OFFICE 2,203,255

APPARATUS FOR MAKING BOBBIN CORE TUBES

Leon C. Deane, Springfield, Mass., assignor to Bay State Thread Works, Springfield, Mass., a corporation of Massachusetts Application May 13, 1939, Serial No. 273,420

11 Claims. (Cl. 164—38)

This invention relates to improvements in bobbin core tubes, and apparatus for making the same.

An object of this invention is to provide a bobbin core tube upon which a plurality of thread masses may be wound to form bobbins, after which the whole may be handled as a unit until after tucking, trimming, and inspecting operations are completed, when the shuttle bobbins for sewing machines and tube may be easily broken apart to form individual bobbins.

A further object of this invention is to provide a bobbin core tube for shuttle bobbins comprising a plurality of axially aligned bobbin cores connected by integral, narrow, bridge portions, whereby operations of multiple winding, tucking, trimming, and inspection may be performed on the combined cores as a unit, after which the finished shuttle bobbins may be broken apart into individual units.

Another object of this invention is to provide a machine for manufacturing the bobbin core tubes herein described.

These, and other objects and advantages of this invention, will be more completely disclosed and described in the following specification, the accompanying drawings, and the appended claims.

Preferred embodiments of this invention are illustrated in the accompanying drawings, in which Figs. 1–6 illustrate the article of manufacture, and Figs. 7–22 illustrate apparatus for making the article.

Figure 20:
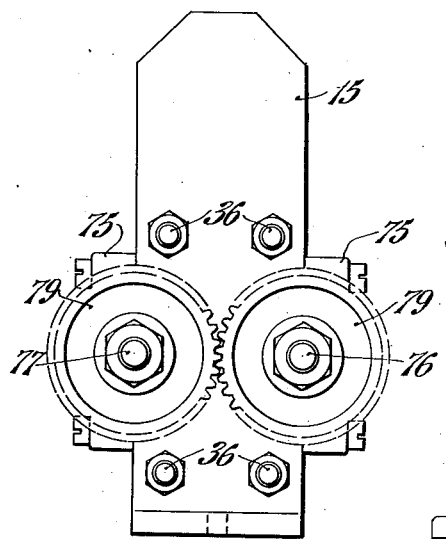
Figure 19:
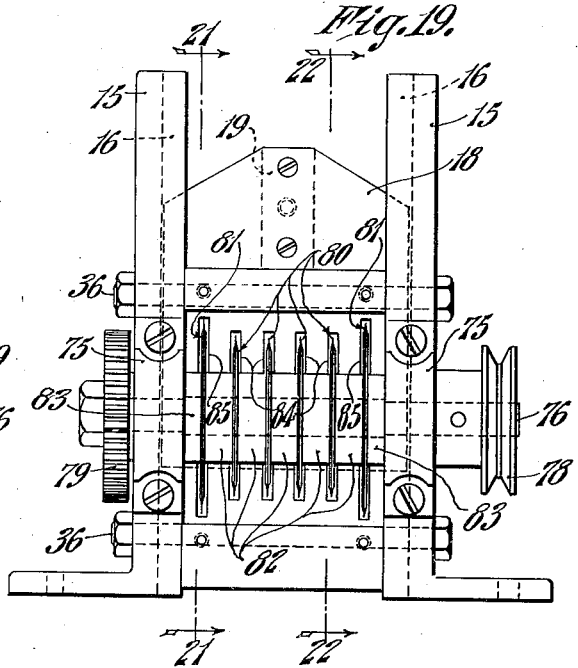
Figure 21:
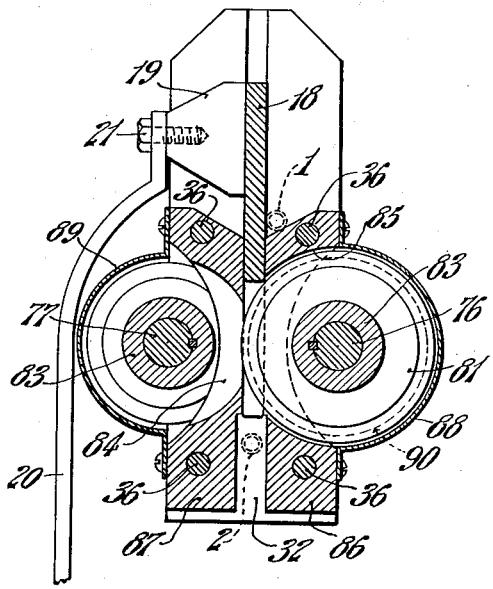
Figure 22:
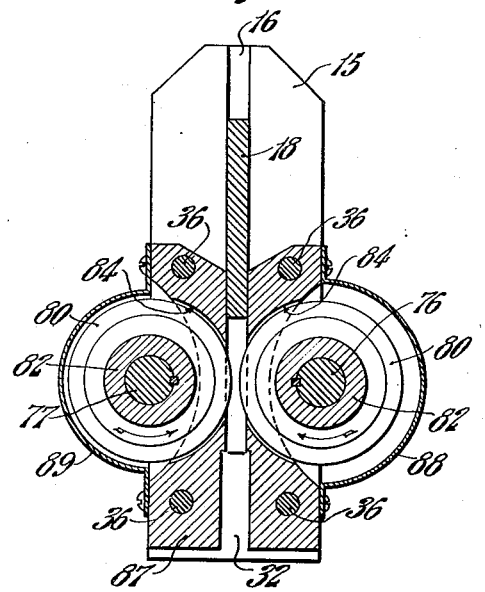

Fig. 1 is an elevational view of a plurality of thread masses wound upon the bobbin core tube to form thread bobbins, Fig. 2 is an elevational view of a single thread bobbin, broken apart from the assembly shown in Fig. 1, Fig. 3 is an elevational view of a standard bobbin tube core from which this invention is made, Fig. 4 is an elevational view of a bobbin tube core, at an enlarged scale, showing the spaced slots and waste ends cut off from the tube shown in Fig. 3, Fig. 5 is a cross sectional view taken on the line 5—5 of Fig. 4, Fig. 6 is a view similar to Fig. 5, showing a modified form of tube, Fig. 7 is a side elevational view of a machine for slitting the bobbin core tubes, Fig. 8 is a front elevational view, partially in section, taken on the line 8—8 of Fig. 7, Fig. 9 is a sectional view taken on the line 9—9 of Fig. 8, Fig. 10 is a partial view similar to Fig. 9, taken on the line 10—10 of Fig. 14, Figs. 11, 12, and 13 are enlarged sectional views showing the delivery chute gate bar in its several operating positions, Fig. 14 is a sectional view taken on the line 14—14 of Fig. 9, Fig. 15 is a partial sectional view taken on the line 15—15 of Fig. 14, Fig. 16 is a perspective view of the punch plate for forcing the tubes through the knives, Fig. 17 is a perspective view of one of the spacer blocks for the knives, Fig. 18 is a view similar to Fig. 10, showing a modified form of construction for slitting the tube illustrated in Fig. 6, Fig. 19 is an elevational view of a modified form of slitting device, using rotary knives, or saws, Fig. 20 is an end elevation of the device illustrated in Fig. 19, Fig. 21 is a sectional view taken on the line 21—21 of Fig. 19, and Fig. 22 is a sectional view taken on the line 22—22 of Fig. 19.

Referring now to the drawings in detail, in which like numerals refer to like parts throughout, A tube, or core 1, of laminated paper or other suitable material is cut to a predetermined length to provide a bobbin core tube 2, leaving waste ends 3, and the tube 2 is formed with spaced pairs of oppositely disposed slits 4, leaving connecting portions 5, and dividing the tube 2 into sections 6. A number of threads or leads, equal to the number of sections 6 is then wound on the tube 2 to form bobbins 7, as indicated in Fig. 1, with the slits 4 located between the bobbins 7. Thus, a unitary, multiple bobbin 8 is formed, which may be freely handled for operations of trimming, tucking, and inspection. In this form, the ends 9 of the threads are all arranged alike on the assembly 8, and work may be performed much more rapidly and accurately on the bobbins 7 than similar work can be performed on single bobbins, one at a time. For example, as the ends 9 are all in line, and the wind of the bobbin in the same direction, the ends may be tucked, as indicated in Fig. 2, very rapidly and efficiently. When the bobbins are ready for packing, they are readily broken apart to provide individual bobbins, as indicated in Fig. 2.

A modified form of bobbin tube is illustrated in Fig. 6, in which the tube 2 is slitted entirely from one side, leaving a bridging or connecting segment 10.

The length of the tube 2, and the number and spacing of the sections 6, will vary with the width of the individual bobbin to be wound, and experience has shown that from four to seven bobbins may be wound on one of these tubes efficiently, depending upon the width of the finished bobbin.

An apparatus for manufacturing the tube 2 is illustrated in Figs. 7–22, inclusive.

A table or bench 11 is provided with a top 12 on which is mounted a base plate 13. A slitting device 14, having side plates 15 formed with vertical channels 16, is removably secured on the base plate 13 by means of thumb screws 17. A punch plate 18, slidably guided in the channels 16, is provided with a coupling block 19, to which a driving link 20 is removably connected by means of a screw 21. The opposite end of the link 20 is connected to a crank disk 22, driven by any suitable means, such as tight and loose pulleys 23 and 24.

As the length of the tube 2, and the number of sections 6 into which it is divided, will vary with the width of bobbin to be wound thereon, a slitting device 14 is provided for each different width of bobbin, and the slitting devices are interchangeable on the plate 13. Each is provided with a punch plate 18 and coupling block 19 to which the driving link 20 may be removably connected. The link 20 passes through an elongated slot 25 in the plate 13 and an opening 26 in the table top 12.

Each of the slitting devices 14 includes side plates 15, a punch plate 18, and a plurality of opposed pairs of knife blades 27 and 28, longitudinally spaced by means of spacer blocks 29 and 30. The total width of the blocks 29 and knives 27 is equal to the length of the tube 2, and the distance between inside faces 31 of the side plates 15 is slightly greater than the length of the tube 1. The blocks 29 are arranged to provide a passage 32 between them, registering with the channels 16 in the side plates 15, for receiving the tubes 1, and the knife blades 27 and 28 are guided and supported on rods 33 which pass through openings or bores 34 in the blocks 29 and 30 and into sockets 35 in the side plates 15. The intermediate blades 27 are arranged with their cutting edges projecting into the passage 32 and converging toward the bottom, as indicated in Fig. 9, but spaced from each other to provide the connecting portions 5 in the tube 2. The end blades 28 may be arranged to meet or overlap, as indicated in Fig. 10, to cut off the ends of the tube 1. The blocks 29 and 30, and blades 27 and 28, are securely and solidly held in proper position by clamping screws 36, which pass through openings or bores 37 in the blocks 29 and 30 and through the side plates 15. The punch plate 18 is formed with slots 38 which register with the knives 27 and 28 and which are wider than the thickness of the knives, so that the punch plate 18 never touches the knives 27 or 28.

In operation, a tube 1 is delivered onto the top of the blocks 29 and 30 with the punch plate 18 in its lower position, as shown by full lines in Fig. 9. The tube 1 lays against the plate 18 until the plate 18 is raised sufficiently to clear the tube 1, as shown by dotted lines in Fig. 9, when the tube 1 drops into the passage 32 and onto the knives 27 and 28. As the punch plate 18 moves downwardly, the tube 1 is forced through the knives, which slit the tube 1 and cut off the ends to form the tube 2. A chute 39 directs the tubes 2 into a container 40 at the rear of the table 11, and waste chutes 41 direct the waste ends 3 of the tubes 1 into a container 42 supported on the table 11.

The modified form of tube, shown in Fig. 6, may be made by arranging the knives in the slitter, as shown in Fig. 13. The knives 27 are arranged on one side only, and project nearly across the passage 32, and the blocks 29 are opposed by a solid block 43. As the tubes 1 are forced through the knives 27, the tubes are slitted across from one side, leaving the segmental bridge or connecting portion 10.

The tubes 1 are stored in a hopper 44, supported from the table top 12 by means of a bracket or frame 45. The hopper 44 is formed with a delivery opening 46, (see Fig. 9), communicating with a delivery chute 47, and a vertically reciprocable gate 48 in the hopper 44 is operated to open and close the opening 46 to permit one of the tubes 1 to emerge from the hopper 44 into the chute 47. The gate 48 is formed with a slanted top or roof portion 49 to prevent sticking or crowding of tubes 1 which may lodge thereon, and the gate 48 is supported on a shaft 50 which is pivotally supported on brackets 51 secured on the hopper 44 by means of pivot arms 52. A rod 53, (see Fig. 7), connected to the shaft 50 and guided in a sleeve 54 secured in the table top 12 is provided, at its lower end, with a roller 55, which rides in a groove 56 in a lever 57. One end 58 of the lever 57 is pivotally supported on the table 11, and a roller 59, rotatably supported on the opposite end of the lever 57, is engaged by a clip 60 adjustably clamped on the link 20. As the link 20 moves upwardly, the rod 53 is raised, opening the gate 48. As the link 20 moves downwardly, a spring 61 maintains engagement of the rod 53 and lever 57, causing the gate 48 to move downwardly, closing the opening 46.

It is important that, for each operation of the punch plate 18, a single tube 1 should be delivered to the slitting device 14. To provide for such a delivery, an oscillating gate bar 62 is pivotally supported on the delivery chute 47, and operated by means of a gear 63 and rack 64. The rack 64 is supported on a rod 65 which is guided in a sleeve 66, and provided, at its lower end, with a roller 67 engaged in the groove 56 in the lever 57. Thus, the gate 48 in the hopper 44, the gate bar 62 in the delivery chute 47, and the punch plate 18, are operated simultaneously by means of the link 20 and crank disc 22. A spring 68 maintains engagement of the roller 67 in the groove 56.

Oscillating gate bars in feeding devices are old, and well known in the art. However, some difficulties are involved in their operation. In the operation of the common type of gate bar, when the bar is moved to permit delivery of the first of a series of articles held back by the bar, the articles back of the first one follow in contact with it until stopped by the gate bar. Then, on the opposite movement of the bar, these articles are pushed backward as the front of the bar moves into position. This backward movement of articles behind the gate bar causes them to crowd, pile up, and become distorted or misshapen, as the result of the opposing forces of the weight and pressure of the articles themselves and the backward movement of the gate bar. I have devised a gate bar which eliminates all backward movement of articles in a delivery chute which are held by the gate bar. The gate bar 62, as best illustrated in Figs. 11, 12, and 13, is formed with a nose portion 69 and tail portion 70, connected by a concave surface 71 having a radius slightly larger than the radius of the tube 1. The tail portion 70 is provided with a convex surface 72 having a radius centered on the pivotal axis of the gate bar 62. The operation of the gate bar 62 is illustrated in Figs. 11, 12, and 13. In Fig. 11, the gate bar 62 is in holding position, with the nose portion 69 holding back a series of tubes 1. In Fig. 12, the gate bar 62 is shown in intermediate position, with the first of the tubes 1 in position to be released, and with the second of the tubes 1' engaged by the surface 72 of the tail portion 70. In Fig. 13, the gate bar 62 is shown in releasing position, with the first of tubes 1 released, and the second tube 1' still held in the same position as shown in Fig. 12. In the return movement of the gate bar 62, the second tube 1' is held in position without moving until the tail portion 70 clears the top of the tube 1', at which time the series of tubes 1 will again move forward until the tube 1' occupies the position of the first tube 1 in Fig. 11. It will thus be readily understood that, at no time in the operation of the gate bar 62, are the tubes behind the gate bar moved in any direction, except forwardly. Such an operation of the gate bar is particularly important in the handling of delicate articles which are easily crushed or deformed, such as paper tubes.

A grille 73 is secured over the delivery chute 47 to constrain the tubes 1 between the delivery opening 46 in the hopper 44 and the gate bar 62. The delivery chute 47 stops short of the slitting device 14, and is provided with a hinged extension 74 which normally extends between the side plates 15 of the slitting device 14, but which may be raised, as shown in Fig. 9 to permit removal and exchange of one device 14 for another.

A modified form of slitting device is illustrated in Figs. 19, 20, 21 and 22. In this device, rotating knives or saws are used in place of the stationary blades 27 and 28. Bearings 75 are secured on the side plates 15, and shafts 76 and 77 are journaled in the bearings 75. A pulley 78, secured on one of the shafts, such as shaft 76, may be driven from any convenient source of power, (not shown). Gears 79 provide means for driving the opposite shaft 77.

Intermediate cutting discs 80 are removably secured on the shafts 76 and 77, and end cutting discs 81 are removably secured on the shaft 76, and the discs 80 and 81 are properly spaced by means of washers or collars 82 and 83 slipped on the shafts 76 and 77. The discs 80 and 81 project through slots 84 and 85, respectively, formed in opposed blocks 86 and 87, into the passage 32 between the blocks 86 and 87. Guards 88 and 89, secured on the blocks, prevent accidental contact with the discs 80 and 81.

The tube, disclosed in Fig. 6 of the drawings, may be manufactured in this device by removing the shaft 77 and parts thereon, and substituting slitting discs 90, shown by dotted lines in Fig. 21, for the discs 80 on the shaft 76.

Having thus described my invention, what I claim is:

1. A slitting machine for bobbin tubes comprising a hopper provided with a discharge opening, a gate reciprocative across said discharge opening, a delivery chute communicating with said discharge opening, an oscillating gate bar in said delivery chute, a slitting device provided with a vertical passage into which passage tubes are delivered from said delivery chute, spaced knives in said slitting device projecting into said passage, a punch plate vertically reciprocative in said passage, and means for operating said gate, gate bar, and punch plate.

2. A slitting machine for bobbin tubes comprising a hopper provided with a discharge opening, a gate vertically movable across said discharge opening, a delivery chute communicating with said discharge opening, a gate bar pivotally supported and extending transversely across said delivery chute, a slitting device provided with a vertical passage into which said tubes are delivered, a hinged extension on said delivery chute extending into said slitting device, a plurality of spaced knives in said slitting device, said knives projecting into said vertical passage, a punch plate guided in said passage and vertically movable therein, and means for simultaneously operating said gate, gate bar, and punch plate.

3. A slitting machine for bobbin tubes comprising a hopper provided with a discharge opening, a gate vertically movable across said discharge opening, a delivery chute communicating with said discharge opening, a gate bar pivotally supported and extending transversely across said delivery chute, a slitting device provided with a vertical passage into which said tubes are delivered, a hinged extension on said delivery chute extending into said slitting device, a plurality of spaced knives in said slitting device, said knives projecting into said vertical passage, a punch plate guided in said passage and vertically movable therein, and means for simultaneously operating said gate, gate bar, and punch plate, said means comprising a drive shaft, a pulley on said drive shaft, a crank on said drive shaft, a link member connected to said crank and removably connected to said punch plate, and operative connecting means between said link member and said gate and gate bar.

4. A slitting device for tubes comprising a pair of side plates spaced apart and each formed with a central vertical track groove, a plurality of spacer blocks clamped between said side plates and arranged in opposed relation and spaced apart to provide a vertical passage registering with said track grooves, knives secured between said spacer blocks and projecting into said passage, a punch plate guided in said track grooves for vertical reciprocating movement in said passage, and means for operating said punch plate.

5. A slitting device for bobbin tubes comprising a pair of side plates, two series of block members secured between said side plates in opposed relation, said series of blocks being spaced apart to provide a passage for the tubes between them, knife blades secured between the blocks in each series and projecting into said passage in opposed relation, a punch plate for forcing tubes through said passage, said punch plate being formed with slots extending upwardly from its bottom edge and registering with said knives, means for operating said punch plate.

6. A slitting device for bobbin tubes comprising a frame formed with a vertical passage for receiving the bobbin tubes, knife members secured in said frame, said knife members being spaced transversely of said frame and projecting into said passage, a punch plate for forcing bobbin tubes through said passage and beyond said knives, whereby the bobbin tubes are slitted as they pass said knives.

7. A machine for slitting bobbin tubes comprising a frame formed with a vertical passage for receiving the bobbin tubes, knife members secured in said frame, said knife members being spaced transversely of said frame and projecting into said passage, a punch plate for forcing bobbin tubes through said passage and beyond said knives, whereby the bobbin tubes are slitted as they pass said knives, gravity means for feeding tubes to said slitting device including a hopper supported above said slitting device and provided with a discharge opening at the bottom, a delivery chute communicating with said discharge opening and inclined downwardly therefrom into said slitting device, a gate in said hopper and reciprocative across said discharge opening, a gate bar pivotally supported across said delivery chute, and means for simultaneously operating said punch plate, gate, and gate bar.

8. A slitting device for bobbin tubes comprising a frame provided with a centrally disposed passage for bobbin tubes, a plurality of pairs of knives supported in said frame in spaced relation, the knives in each pair being arranged in opposed relation and projecting into said passage, the knives in the intermediate pairs being arranged with their cutting edges spaced from each other, and the knives in the end pairs being arranged with their cutting edges overlapping, a punch plate for forcing bobbin tubes through said passage, whereby bobbin tubes forced through said passage will be cut to a predetermined length and formed with spaced, opposed pairs of transverse slits.

9. A slitting device for bobbin tubes comprising a frame member, shafts rotatably supported on each side of said frame member, said frame member being provided with a passage for bobbin tubes located between said shafts, knife discs supported on said shafts in spaced relation and projecting into said passage, means for rotating said shafts, a punch plate for forcing bobbin tubes through said passage and by said knife discs, and means for operating said punch plate.

10. A slitting device for bobbin tubes comprising a frame provided with a centrally disposed passage for bobbin tubes, a plurality of pairs of knives supported in said frame in spaced relation, the knives in each pair being arranged in opposed relation and projecting into said passage, the knives in the intermediate pairs being arranged with their cutting edges spaced from each other, and the knives in the end pairs being arranged with their cutting edges overlapping, a punch plate for forcing bobbin tubes through said passage, whereby bobbin tubes forced through said passage will be cut to a predetermined length and formed with spaced, opposed pairs of transverse slits, delivery chutes communicating with the bottom of said passage and arranged to separate the slitted tubes and the waste ends.

11. A slitting device for bobbin tubes comprising a hopper provided with a discharge opening, a gate reciprocative across said discharge opening, a delivery chute communicating with said discharge opening, a gate bar pivotally supported and extending across said delivery chute, said gate bar being formed with a nose portion and a tail portion and a concave under surface between said nose and tail portions, said tail portion being formed with a convex surface having a radius centered on the pivotal axis of said gate bar, a slitting device provided with a passage for receiving bobbin tubes from said delivery chute, a plurality of spaced knives in said slitting device, said knives being arranged to project into said passage, a punch plate reciprocative in said passage for forcing bobbin tubes through said passage, means for operating said gate, said gate bar, said said punch plate.

LEON C. DEANE.